United States Patent [19]

Blomgren, Sr. et al.

[11] 3,862,391

[45] Jan. 21, 1975

[54] METHOD AND APPARATUS FOR REMOVING MATERIAL FROM A WORKPIECE

[75] Inventors: Oscar C. Blomgren, Sr.; Oscar C. Blomgren, Jr., both of Lake Bluff, Ill.

[73] Assignee: Inter-Probe, Inc., North Chicago, Ill.

[22] Filed: Dec. 20, 1973

[21] Appl. No.: 426,504

[52] U.S. Cl. ................................. 219/68, 83/171
[51] Int. Cl. ........................................... B23p 25/00
[58] Field of Search ............ 219/68, 70, 69 R; 82/1; 83/171; 90/1; 408/56

[56] References Cited
UNITED STATES PATENTS

| | | | |
|---|---|---|---|
| 2,797,301 | 6/1957 | Copleston | 219/70 X |
| 2,861,166 | 11/1958 | Cargill, Jr. | 219/68 |
| 3,109,915 | 11/1963 | Wennberg et al. | 219/68 |

*Primary Examiner*—Bruce A. Reynolds
*Attorney, Agent, or Firm*—Lockwood, Dewey, Zickert & Alex

[57] ABSTRACT

Method and apparatus for removing material from an electrically conductive workpiece, including a material removal tool mounted adjacent to and in material removal relation with a rotatably supported and driven workpiece, a probe electrically insulated from the tool and workpiece having a tip end spaced adjacent to the workpiece and tool but closer to the workpiece than the tool, and a high-voltage D.C. source connected between the probe and the tool and producing a potential level sufficient to create an electrical arc between the tip end of the probe and the workpiece.

29 Claims, 3 Drawing Figures

Patented Jan. 21, 1975

3,862,391

METHOD AND APPARATUS FOR REMOVING MATERIAL FROM A WORKPIECE

This invention relates in general to a method and apparatus for removing material from a workpiece in order to shape or dimension the workpiece, and more particularly to a method and apparatus capable of materially increasing tool life and making possible the use of certain tools for removing material from certain workpieces, and still more particularly to a method and apparatus for carrying out metal removal operations where the tool life is significantly increased.

The method and apparatus of the present invention is primarily concerned with metal removal operations such as in the machining of metal parts and where the metal parts are electrically conductive, although the invention is also applicable to the machining or material removal for any type of electrically conductive workpiece. For example, the present invention is especially useful for the machining of steel, aluminum or any ferrous and non-ferrous metals.

Heretofore, it has been well known to machine metal parts by use of tools made of ceramics, tool steel, tungsten carbide, and the like. It is also well known that efficient machining demands the use of liquid coolants although it would be preferred to machine dry without the use of liquid coolants. Efficient dry machining has not been heretofore possible.

With the increased value of scrap metals, such as created by chips, shavings and the like during the machining of metals, it has become economically feasible to recover such scrap for sale purposes and subsequent conversion to a usable state. The value of dry and uncontaminated scrap is worth substantially more than scrap that has been wetted with a coolant. Moreover, the use of coolants which usually include undesirable chemicals for sewage disposal requires special treatment of waste coolant that becomes costly. Accordingly, the advantage of dry machining for today's industry becomes readily apparent. Presently known dry machining is not economically feasible because of high tool wear which is caused by high heat generated during machining operations. It is this reason that coolants are normally used to dissipate heat generated during machining operations and to thereby enhance tool life. It should be further recognized that short tool life, while in itself being costly for the mere replacement of tools, is equally or more costly because of machine shutdown time and labor costs in the replacement of worn tools. It may therefore be appreciated that the utilization of dry machining processes are important from the standpoint of meeting new ecological standards. One other disadvantage in connection with using coolants such as cutting oils in connection with the machining of metal parts is that such causes the environment to be contaminated by smoke and odors created during the machining process.

The method and apparatus of the present invention overcomes the above difficulties in providing an economically feasible dry machining process inasmuch as tool life is increased substantially over tool life of heretofore known dry machine processes. It should also be appreciated that the method and apparatus of the present invention can be used in connection with the use of liquid coolants wherein tool life is even further improved substantially.

It is also well known that diamond cutting tools are desirable for producing smooth mirror-like surfaces and high precision tolerances. However, natural diamonds have weaknesses along certain crystallographic planes which cause failure due to cleavage along such planes. Not long ago a man-made polycrystalline opaque diamond cutting tool, which does not have the crystallographic plane weakness of the natural diamond, has been developed by Megadiamond Industries, Inc. of New York. Hereafter this diamond cutting tool will be referred to as a polycrystalline diamond cutting tool. This tool has been effective for machining of non-ferrous metal but has not been practical for ferrous metals.

The present invention overcomes the above named difficulties and makes it possible to machine ferrous materials with diamond cutting tools, such as the polycrystalline diamond cutting tool above referred to.

The present invention is primarily hereinafter described in connection with a lathe machining operation although it should be appreciated that it could be applied where any material removal operation is conducted in association with an electrically conductive material. In a lathe, the cutting tool is stationary while the workpiece rotates. It will be appreciated the present invention can also be used with machines where the workpiece is stationary and the tool moves, such as in a milling machine or a shaper. Moreover, in order to simplify the description of the invention, reference will be made to the workpiece as being a metal workpiece although it should be appreciated that the invention applies as well to any electrically conductive material. Machining on a lathe involves the supporting and rotation of a workpiece together with the supporting of a cutting tool adjacent to and in cutting relation with the revolving workpiece. It can be appreciated that in the lathe the cutting tool will be associated with the workpiece to obtain the desired depth of cut and will be movable along the workpiece at a desired rate of surface feet per minute to establish a desired cutting rate. The method and apparatus of the present invention includes the mounting of a probe having a tip end arranged adjacent to the workpiece and the cutting tool but spaced closer to the workpiece than the cutting tool. The probe is preferably mounted on the support for the cutting tool and is electrically insulated therefrom. Accordingly, the probe is electrically insulated from the workpiece and the cutting tool. A source of high-voltage D.C. potential is connected between the probe and the cutting tool. This potential is at a level sufficient that an electric arc is created between the tip end of the probe and the workpiece. Further, the probe is mounted so that the tip end is in substantial alignment with the step, that is, the plane of metal removal along the workpiece. A potential that has proven satisfactory includes a voltage level of about 4,000 volts and 5 milliamperes. It has been found that use of the present invention increases the life of carbide cutting tools in dry machining processes by at least 1000 percent, while permitting for the first time the practical use of polycrystalline diamond cutting tools on ferrous metals.

It is therefore an object of the present invention to provide a method and apparatus for removing material from a workpiece which significantly increases the life of material removing tools.

Another object of this invention is in the provision of a method and apparatus for application in metal machining operations where the life of the machining tools is materially increased and where the use of cutting tools in dry machining processes is economically feasible.

Still another object of this invention is in the provision of a method and apparatus for use in the machining of metal workpieces which permits much higher machining speeds than heretofore possible with the concurrent significant increase in cutting tool life.

A further object of this invention is to provide a method and apparatus which greatly broadens the use of diamond cutting tools.

A still further object of this invention is in the provision of a method and apparatus for machining of ferrous and non-ferrous parts which greatly reduces the overall costs of machining, enables machining scraps to be at a significantly higher value, and permits the omission of liquid coolants which pollute sewage systems.

Other objects, features and advantages of the invention will be apparent from the following detailed disclosure, taken in conjunction with the accompanying sheet of drawings, wherein like reference numerals refer to like parts, in which.

Figure 1:
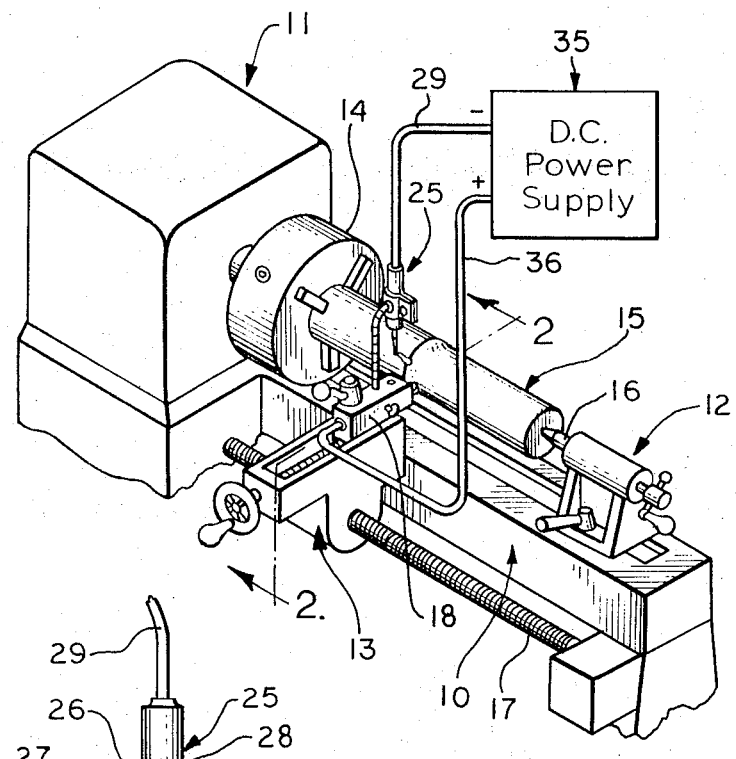
FIG. 1 is a somewhat diagrammatic and fragmentary perspective view of an apparatus according to the present invention as illustrated with a lathe.

The method and apparatus of the present invention, as applicable to the machining of ferrous and non-ferrous metals, as well as any other electrically conductive material, essentially comprises the creation of a continuous electrical arc between a probe and the workpiece during the metal removal operation. Establishment of the arc is accomplished by the connection of the probe and the cutting tool with a high-voltage D.C. power supply. Preferably, the potential is on the order of 4,000 volts and 5 milliamperes. The probe is closer to the workpiece than the cutting tool in order to assure that the arc established is between the probe and the workpiece.

Referring now to the drawings to further illustrate the present invention, a lathe is illustrated which includes a horizontal bed 10 mounting a head stock 11 at one end, and a tail stock 12 at the other end. A cross slide 13 for mounting and moving a cutting tool along the bed is arranged in relation to the bed. The head stock includes a chuck 14 for supporting and having secured thereto one end of a metal workpiece or part 15. Suitable drive means is provided in the head stock for rotatably driving the chuck and any workpiece attached thereto at a suitable speed so that the workpiece will present a suitable rate of surface feet per minute to a stationary cutting tool. The tail stock 12 is adjustably movable along the bed and provided with a support pin 16 engaging in a recess formed in the end of the workpiece 15. The cross slide 13 is suitably mounted on a threaded drive rod 17 which is suitably driven through the head stock end at a desired speed to provide a feed of a predetermined amount in inches per revolution of the workpiece.

Figure 2:
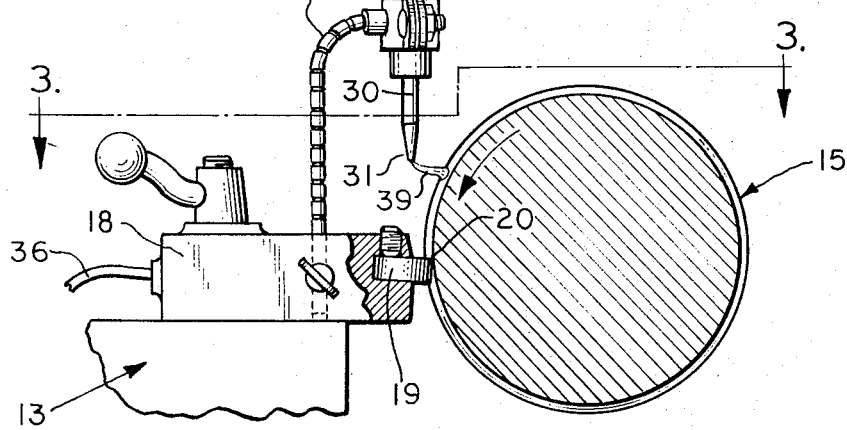
FIG. 2 is an enlarged sectional view taken substantially along line 2—2 of FIG. 1.
Figure 3:
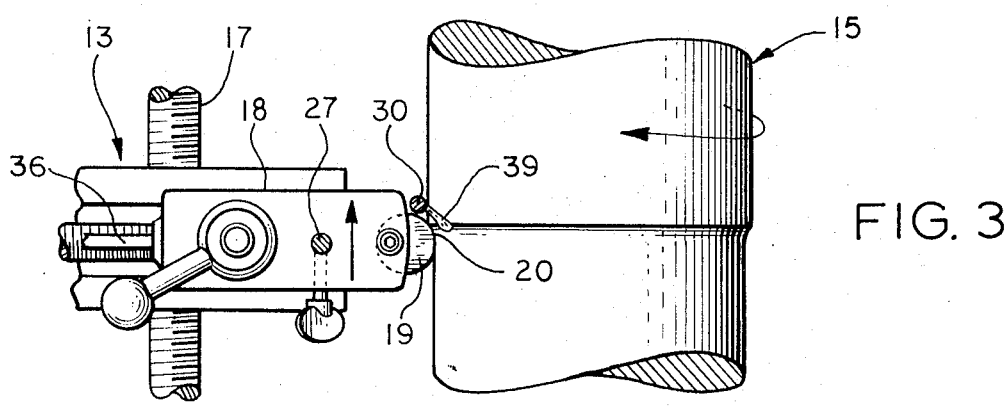
FIG. 3 is a sectional view taken substantially along line 3—3 of FIG. 2.

The cross slide 13 supports a suitable tool holder 18 which in turn supports a suitable cutting tool 19. The cutting tool 19 illustrated is in the form of a circular disc and is of a type such as commercially available in a diamond cutting tool, and more particularly in a polycrystalline diamond cutting tool. This cutting tool defines a cutting edge 20 shown particularly in FIGS. 2 and 3 as in cutting engagement with the workpiece 15. It will be appreciated that the tool holder 18 is movable toward and away from the workpiece to provide a desired depth of cut during machining of the workpiece.

In accordance with the invention, a probe 25 is illustrated as being mounted adjacent to the workpiece and the cutting tool by a bracket 26 carried on one end of an adjustable arm 27 and where the other end of the arm is suitably secured to the tool holder 18. The probe 25 includes a suitable housing 28 of electric insulating material and from which extends an insulated conductor 29 at the upper end and an uninsulated conductor 30 at the lower end. The uninsulated conductor 30 is in the form of a needle having a sharply pointed tip end 31 which is arranged to be in closely spaced relation to the workpiece 15 and the cutting tool 19 but much closer to the workpiece. It will be appreciated that the tool holder 18, as well as the cutting tool 19, is of electrically conductive material. A D.C. power supply 35 is connected between the probe 25 and the tool holder 18 by the insulated conductor 29 and an insulated conductor 36. Preferably, the negative terminal of the power supply is connected to the probe, while the positive terminal or ground side is connected to the tool holder and therefore the cutting tool. The tip end 31 of the probe is spaced from the workpiece and closer to it than to the cutting tool, and the level of potential in the D.C. power supply is such as to produce a readily visible arc between the tip end of the probe and the workpiece as depicted at 39. This arc is continuous during the machining operation. Also a barely visible arc is produced between the workpiece and the tool. The level of the potential is on the order of 4,000 volts and 5 milliamperes where the tip end of the probe is spaced about three-sixteenths inch from the workpiece and about seven-sixteenths inch from the cutting tool. The application of the potential functions as a coolant during machining of a workpiece to allow but a slight increase in workpiece and cutting tool temperatures, thereby greatly increasing the life of the tool and enhancing the finish of the workpiece. It should be appreciated that a greater spacing must always be provided between the tip end of the probe and the tool holder than between the tip end of the probe and the workpiece in order to assure the creation of the arc between the tip end of the probe and the workpiece.

It has been found that the method and apparatus for machining metals according to the present invention has substantially increased cutting tool life and has enabled the economic use of diamond cutting tools in the machining of steels. Specifically, the present invention substantially increases the life of a polycrystalline diamond cutting tool by at least five hundred percent during dry machining where the workpiece is 390 aluminum alloy which is known as an extremely abrasive hypereutectic aluminum silicone alloy that has found wide use in aluminum engine blocks.

The method and apparatus of the present invention has also been successfully used to materially extend tool life in dry machine processes in connection with the machining of 1018 and 1113 steel, and Inconel where polycrystalline diamond cutting tools, such as discs made by Megadiamond Industries, Inc., are employed. Moreover, the present invention has increased the life of carbide cutting tools in the machining of these steels by about one thousand percent. So with the present invention diamond cutting tools can now be efficiently and effectively used for the first time in the dry machining of steels by the substantial improvement of tool life.

The following examples of actual tests made more clearly illustrate the present invention and its advantages, where machining was conducted on a 1973 South Bend 14-inch electronic-controlled variable speed, tachometer equipped lathe with an Enco Model Q45 tool post. Both polycrystalline diamond cutting tools of Megadiamond Industries Inc., and C-2 Carbide cutting tools were used in machining 390 aluminum alloy, 1018 CR steel, and 718 aged Inconel workpieces. Before testing all workpieces were chucked in the lathe and trued with a 1/10,000 indicator. In all tests where the present invention was applied, the distance between the tip end of the probe and the tool was seven-sixteenths inch, the tip end of the probe and the workpiece was three-sixteenths inch, and the tip end of the probe led the cut by one-sixteenth inch.

EXAMPLE I

Workpiece: 390 Cast Aluminum, Hardness $R_B 75$
Cutting Speed: 1250 ft/min, 381 m/min
Feed: 0.0019 inch/rev, 0.048 mm/rev
Depth of Cut: 0.010 inch, 0.254mm
Tool: Megadiamond disc and holder
Cutting Time: 60 minutes
Tool End point: 0.015 inch flank wear, 0.381mm
Coolant: Probe of invention — 4 kilovolts, 5 milliamperes
Tool Life: 56 minutes to Tool End Point

EXAMPLE IA

All conditions same as Example I but cutting speed increased to 2,000 ft/min, 609.6m/min.
Tool Life: 9 min 14 sec to Tool End Point

EXAMPLE IB

All conditions same as Example IA but liquid coolant also applied to workpiece. (Liquid coolant — Cimcool-Al, trademark of Cincinnati Milicron Co., Cincinnati, Ohio.)
Tool Life: 23 min 40 sec to Tool End Point

EXAMPLE IC

All conditions same as Example IB but cutting speed decreased to 1,250 ft/min, 381m/min
Tool Life: 140 min to Tool End Point

EXAMPLE II

Workpiece: 1018 CR Steel 1.375 inch diameter
Cutting Speed: 150 ft/min, 45.72 m/min
Feed: 0.0019 inch/rev, 0.048mm/rev
Depth of Cut: 0.015 inch, 0.381 mm
Tool: Megadiamond disc and holder
Cutting Time: 60 minutes
Coolant: Probe of invention — 4 kilovolts, 5 milliamperes
Result: After 60 minutes of dry machining, measurable wear on the tool flank in the vertical plane was less than 0.005 inch.

EXAMPLE IIA

All conditions same as Example II but a new Megadiamond disc was used and the probe of the invention was not used.
Result: After 60 minutes of dry machining, measurable wear on the tool flank was 0.016 inch.

EXAMPLE III

Workpiece: 1018 CR Steel 1.375 inch diameter
Cutting Speed: 480 ft/min, 146.3 3m/min
Feed: 0.0038 inch/rev, 0.096 mm/rev
Depth of Cut: 0.008 inch, 0.203 mm
Tool: C-2 Carbide
Cutting Time: 15 minutes
Coolant: Probe of the invention — 4 kilovolts, 5 milliamperes
Result: After 15 minutes of machining dry with the probe of the invention, the C-2 Carbide tool showed only slight wear. The flat across the nose of the tool, originally 0.015 inch wide on the top surface, was measured to be 0.016 inch wide indicating 0.001 inch wear per 15 minutes of machining.

EXAMPLE IIIA

All conditions same as Example III, but a new C-2 Carbide tool was used and the probe of the invention was not used.
Result: After 15 minutes of machining dry under the test conditions and without the probe of the invention, the C-2 Carbide tool showed extreme wear. The flat across the nose measured 0.030 inch wide and was rounded.

EXAMPLE IV

Workpiece: 1018 CR Steel 1.375 inch diameter
Cutting Speed: 480 ft/min, 146.3 m/min
Feed: 0.0038 inch/rev, 0.096 mm/rev
Depth of Cut: 0.008 inch, 0.203 mm
Tool: Megadiamond disc and holder
Cutting Time: 15 minutes
Coolant: Probe of invention — 4 kilovolts, 5 milliamperes
Result: After 15 minutes of machining dry with the probe of the invention at a cutting speed of 480 ft/min, no measurable wear on the flank of the Megadiamond disc was observed or measurable.

EXAMPLE IVA

The Megadiamond disc used in Example IV was turned 180° in the tool holder and the test was repeated without the probe of the invention.
Result: After 15 minutes of machining dry at a cutting speed of 480 ft/min, a wear land 0.045 inch wide and 0.015 inch down flank was measured.

EXAMPLE V

Workpiece: 718 Aged Inconel
Cutting Speed: 174 ft/min, 53.0 m/min
Feed: 0.0038 inch/rev, 0.096 mm/rev
Depth of Cut: 0.008 inch, 0.203 mm
Tool: Megadiamond disc and holder
Cutting Time: 8 minutes after making variable cuts from 0.008 inch to 0.020 inch with tool 0.015 inch below center line.
Coolant: Probe of invention — 4 kilovolts, 5 milliamperes Result: After 8 minutes machining was terminated, nose wear was measured at 0.012 inches.

Testing of tool life in the machining of 390 cast aluminum under conditions substantially identical to those set forth in Example I, with the exception that no coolant was employed, showed a 10-minute tool life, thereby indicating a 560 percent increase in tool life by utilization of the present invention, as set forth in Example I. Moreover, testing of tool life with the conditions substantially the same as in Example IC, with the exception that the present invention was not utilized, resulted in a tool life of 98 minutes, thereby indicating much greater life is achieved with the present invention where a liquid coolant is employed over heretofore known machining methods.

With respect to the machining of a 1018 CR steel workpiece with and without the present invention where a Megadiamond disc is employed as the cutting tool, it is seen by the Examples II and IIA that the present invention extends tool life in excess of 300 percent. Where C-2 Carbide cutting tools were employed, as in Examples III and IIIA, a substantial improvement in tool life is experienced where the present invention is employed as opposed to no coolant, and it is noted that only slight wear was experienced with the present invention, while extreme wear was experienced without the present invention. Similarly, as noted in the Examples IV and IVA where a Megadiamond disc was used as a cutting tool, tool wear with the present invention was substantially better than without the present invention.

The test documented in Example V clearly illustrates the value of the present invention in machining Inconel which is well known to be extremely difficult to machine.

While the present invention has illustrated the capability of substantially improving tool life, it should be further recognized that in connection with use of the present invention where Megadiamond discs are employed as cutting tools, superior finishes on the workpieces are achieved to the extent that further finishing operations are eliminated in many situations. Several tests, as illustrated hereinafter, were made wherein the microfinish readings were measured in AA at 0.030 inch cutoff.

EXAMPLE VI

Workpiece: 390 Cast Aluminum
Cutting Speed: 1,250 ft/min, 381 m/min
Feed: 0.0015 inch/rev, 0.038 mm/rev
Depth of Cut: 0.005 inch/min, 0.127 mm/min
Tool: Megadiamond disc and holder
Coolant: Probe of invention — 4 kilovolts, 5 milliamperes
Tool Position: 0.015 inch under center line
Finish: AA35 lathe cut

EXAMPLE VII

Workpiece: 1113 CR Steel
Cutting Speed: 480 ft/min, 146 m/min
Feed: 0.0019 inch/rev, 0.048 mm/rev
Depth of Cut: 0.010 inch, 0.254 mm
Tool: Megadiamond disc and holder
Coolant: Probe of invention — 4 kilovolts, 5 milliamperes
Tool Position: 0.015 inch under center line
Finish: AA45 lathe cut

EXAMPLE VIII

Workpiece: 718 Aged Inconel
Cutting Speed: 174 ft/min, 53 m/min
Feed: 0.0038 inch/rev, 0.096 mm/rev
Depth of Cut: 0.008 inch, 0.203 mm
Tool: Megadiamond disc and holder
Coolant: Probe of invention — 4 kilovolts, 5 milliamperes
Tool Position: 0.015 inch under center line
Finish: AA20 lathe cut

EXAMPLE IX

Workpiece: Cast Bearing Bronze
Cutting Speed: 170 ft/min, 52. m/min
Feed: 0.0038 inch/rev, 0.096 mm/rev
Depth of Cut: 0.008 inch, 0.203 mm
Tool: Megadiamond disc and holder
Coolant: Probe of invention — 4 kilovolts, 5 milliamperes
Tool Position: 0.015 inch under center line
Finish: AA22 lathe cut The aforementioned Examples VI, VII, VIII and IX clearly illustrate the excellently cut finishes obtained when employing the present invention.

In view of the foregoing, it can be appreciated that the present invention provides a material breakthrough in connection with dry machine processes to greatly increase the life of carbide cutting tools and diamond cutting tools, and for the first time to make feasible the use of polycrystalline diamond cutting tools in the machining of ferrous metals, and to produce highly desirable machined surfaces.

It will be understood that modifications and variations may be effected without departing from the scope of the novel concepts of the present invention, but it is understood that this application is to be limited only by the scope of the appended claims.

The invention is hereby claimed as follows:

1. Apparatus for precision removal of material from an electrically conductive workpiece comprising, means for rotating the support means and workpiece, an electrically conductive material removal tool, means for supporting the tool in relation to the workpiece for removing material therefrom, a needle-like probe supported adjacent to and electrically insulated from the workpiece and the tool having a tip end, said tip end being spaced closer to the workpiece than the tool, and a source of high-voltage milliampere D.C. potential connected between the probe and tool producing a potential sufficient to create an electrical arc between the tip end and the workpiece.

2. Apparatus as defined in claim 1, wherein the potential is on the order of 4 kilovolts and 5 milliamperes.

3. Apparatus as defined in claim 2, wherein the material removal tool is a carbide cutting tool.

4. Apparatus as defined in claim 2, wherein the material removal tool is a polycrystalline diamond cutting tool.

5. Apparatus as defined in claim 2, wherein the material removal tool is a polycrystalline diamond cutting tool and the workpiece is steel.

6. Apparatus as defined in claim 2, wherein the material removal tool is a polycrystalline diamond cutting tool and the workpiece is 390 aluminum alloy.

7. Apparatus for removing metal from an electrically conductive metal workpiece comprising, means for supporting a workpiece, means for rotating the support means and workpiece at a predetermined speed, an electrically conductive metal removal tool, means for supporting the tool in relation to the workpiece for removing metal therefrom, a power supply for producing a high-voltage milliampere D.C. potential, a needle-like probe supported adjacent to but in spaced relation to the workpiece and the tool and electrically insulated therefrom having a tip end, said tip end being spaced closer to the workpiece than the tool, and means connecting the power supply between the probe and the tool, said power supply producing a voltage level sufficient to create a continuous arc between the tip end and the workpiece, whereby a readily visible arc is created between the tip end of the probe and the workpiece and a barely visible arc is created at the point of metal removal of the cutting tool.

8. Apparatus as defined in claim 7, wherein the means connecting the power supply to the probe and tool includes a first conductor connecting one side of the power supply to the probe, and a second conductor connecting the other side of the power supply to the tool.

9. Apparatus as defined in claim 8, wherein said one side of the power supply is negative and said other side is positive.

10. Apparatus as defined in claim 9, wherein the potential is on the order of 4 kilovolts and 5 milliamperes.

11. Apparatus as defined in claim 10, wherein the electrically conductive metal removal tool is a carbide cutting tool.

12. Apparatus as defined in claim 10, wherein the electrically conductive metal removal tool is a polycrystalline diamond cutting tool.

13. Apparatus as defined in claim 10, wherein the electrically conductive metal removal tool is a polycrystalline diamond cutting tool and the workpiece is steel.

14. Apparatus as defined in claim 10, wherein the electrically conductive metal removal tool is a polycrystalline diamond cutting tool and the workpiece is 390 aluminum alloy.

15. Apparatus for dry machining metal workpieces comprising, means for supporting a workpiece, means for rotating the support means and workpiece at a predetermined speed, an electrically conductive cutting tool, means for supporting the tool in relation to the workpiece for removing metal therefrom, a power supply for producing a high-voltage milliampere D.C. potential, a needle-like probe supported adjacent to but in spaced relation to the workpiece and the tool and electrically insulated therefrom having a tip end, said tip end being spaced closer to the workpiece than the tool, and means connecting the power supply between the probe and the tool, said power supply producing a voltage level sufficient to create a continuous arc between the tip end and workpiece, whereby a readily visible arc is created between the tip end of the probe and the workpiece and a barely visible arc is created at the point of metal removal of the cutting tool.

16. Apparatus as defined in claim 15, wherein the potential is on the order of 4 kilovolts and 5 milliamperes.

17. Apparatus as defined in claim 16, wherein the cutting tool is a carbide cutting tool.

18. Apparatus as defined in claim 17, wherein the cutting tool is a polycrystalline diamond cutting tool.

19. Apparatus for dry machining electrically conductive metal workpieces comprising, a bed, a tool holder mounted on the bed, a workpiece holder mounted on the bed, a machining tool mounted on the tool holder, a needle-like probe supported on the bed in electrical insulated relation therewith, said probe having a tip end adjacent a workpiece supported by the workpiece holder and area of machining of the machining tool, said tip end being spaced closer to the workpiece than said area of machining, a source of high-voltage milliampere D.C. potential, means connecting the said potential between the probe and the machining tool, and said potential being at a level sufficient to maintain a readily visible continuous arc between the tip end of the probe and the workpiece.

20. Apparatus as defined in claim 19, wherein the potential is on the order of 4 kilovolts and 5 milliamperes.

21. Apparatus as defined in claim 20, wherein the workpiece is 390 aluminum alloy and the machining tool is a polycrystalline diamond cutting tool.

22. Apparatus as defined in claim 20, wherein the workpiece is steel and the machining tool is a polycrystalline diamond cutting tool.

23. Apparatus as defined in claim 20, wherein the machining tool is a carbide cutting tool.

24. The method of removing material from an electrically conductive workpiece, wherein the workpiece is mounted on a support that is rotatably driven and an electrically conductive material removing tool is mounted adjacent to and in material removing engagement with the workpiece, said method including the steps of mounting a probe having a tip end in spaced and electrically insulated relation to the workpiece and tool and adjacent to the area of material removal so that the tip end is closer to the workpiece than the tool, and applying a high-voltage milliampere D.C. potential between the probe and the tool such that a continuous electrical arc is created between the tip end of the probe and the workpiece.

25. The method as defined in claim 24, wherein the step of applying a potential further includes maintaining the potential level on the order of 4 kilovolts and 5 milliamperes.

26. The method of dry machining a workpiece, wherein a workpiece holder is mounted on a bed and a machining tool holder is mounted on the bed for holding a machining tool in machining relation to a workpiece mounted in the workpiece holder, which method comprises the steps of mounting an electrically conductive workpiece in the workpiece holder, mounting an electrically conductive machining tool in the tool holder, mounting a needle-like probe having a tip end on the bed in electrically insulated relation to the workpiece and the tool, positioning the tip end in spaced relation to the workpiece and the tool but closer to the workpiece, and connecting a high-voltage milliampere D.C. potential between the probe and the tool such that a continuous arc is presented between the tip end and the workpiece.

27. The method as defined in claim 26, wherein the step of applying a potential includes maintaining the potential level on the order of 4 kilovolts and 5 milliamperes.

28. The method as defined in claim 27, wherein the step of mounting a workpiece in the workpiece holder includes the use of a workpiece of 390 aluminum alloy, and the step of mounting a tool in the tool holder includes the use of a polycrystalline diamond cutting tool.

29. The method as defined in claim 27, wherein the step of mounting a workpiece in the workpiece holder includes the use of a workpiece of steel, and the step of mounting a tool in the tool holder includes the use of a polycrystalline diamoned cutting tool.

* * * * *

UNITED STATES PATENT OFFICE
CERTIFICATE OF CORRECTION

PATENT NO. : 3,862,391
DATED : January 21, 1975
INVENTOR(S) : Oscar C. Blomgren, Sr. and Oscar C. Blomgren, Jr.

It is certified that error appears in the above-identified patent and that said Letters Patent are hereby corrected as shown below:

Col. 2, line 13, change "metal" to --metals--;
Col. 6, line 11, change "146.3 3m/min" to --146.3 m/min--;
Col. 8, line 51, change "an electrical" to --a continuous electrical--; and
Col. 12, line 3, change "diamoned" to --diamond--.

Signed and Sealed this

Twenty-seventh Day of July 1976

[SEAL]

Attest:

RUTH C. MASON
*Attesting Officer*

C. MARSHALL DANN
*Commissioner of Patents and Trademarks*